(12) United States Patent
Cavalotti

(10) Patent No.: US 6,706,134 B2
(45) Date of Patent: Mar. 16, 2004

(54) METHOD AND APPARATUS FOR ASSEMBLING NARROW COMPONENTS ONTO A TIRE BUILDING DRUM

(75) Inventor: Marie-Laure Bénédicte Josette Cavalotti, Michelbouch (LU)

(73) Assignee: The Goodyear Tire & Rubber Company, Akron, OH (US)

(*) Notice: Subject to any disclaimer, the term of this patent is extended or adjusted under 35 U.S.C. 154(b) by 288 days.

(21) Appl. No.: 09/957,779

(22) Filed: Sep. 21, 2001

(65) Prior Publication Data
US 2003/0056876 A1 Mar. 27, 2003

(51) Int. Cl.[7] .................... B29D 30/20; B29D 30/30
(52) U.S. Cl. .................. 156/111; 156/123; 156/133
(58) Field of Search ................ 156/110.1, 111, 156/123, 130, 133, 134, 405.1, 406.2, 406.4, 190

(56) References Cited

U.S. PATENT DOCUMENTS

| | | | |
|---|---|---|---|
| 3,600,252 A | 8/1971 | Henley et al. | |
| 3,623,677 A | 11/1971 | Appleby et al. | |
| 3,989,565 A | 11/1976 | Appleby et al. | |
| 3,993,530 A | 11/1976 | Henley et al. | |
| 4,276,104 A | 6/1981 | Riggs | |
| 4,312,696 A | 1/1982 | Bryant | |
| 4,504,337 A | 3/1985 | Askam et al. | |
| 4,617,074 A | 10/1986 | Portalupi et al. | |
| 4,722,255 A | 2/1988 | Choate et al. | |
| 4,891,082 A | 1/1990 | Broyles et al. | |
| 5,820,726 A | 10/1998 | Yoshida et al. | |

OTHER PUBLICATIONS

U.S. patent application Ser. No. 09/957,785, Zeh et al., filed Sep. 21, 2001.

Primary Examiner—Geoffrey L. Knable
(74) Attorney, Agent, or Firm—Howard M. Cohn

(57) ABSTRACT

A method and apparatus for assembling multiple tire components onto one or more tire building drums at a work station of a tire building system is disclosed. A first inner set of measuring drums is located at a first loading position between a second outer set of measuring drums at a second loading position. Tire components are loaded onto the first and second sets of measuring drums at the first and second loading positions. The first and second sets of measuring drums are alternatively moved from the first and second loading positions into first and second ready positions, respectively. Then the first and second sets of measuring drums are alternatively moved from the first and second ready positions into first and second transfer positions, respectively, where the tire components are transferred to the one or more tire building drums. Then the first and second sets of measuring drums are retracted away from the first and second transfer positions, respectively, to the first and second ready positions. Finally the first and second sets of inner and outer measuring drums are alternatively moved between the first and second ready positions and the first and second loading positions so as to pass one another.

13 Claims, 8 Drawing Sheets

METHOD AND APPARATUS FOR ASSEMBLING NARROW COMPONENTS ONTO A TIRE BUILDING DRUM

CROSS-REFERENCE TO RELATED APPLICATIONS

This application relates to U.S. patent application Ser. No. 09/957,785 entitled METHOD FOR MANUFACTURING TIRES ON A FLEXIBLE MANUFACURING SYSTEM, and filed on even date herewith.

TECHNICAL FIELD

The present invention relates generally to the fabrication of laminated products like motor vehicle tires, more specifically to drum-transfer techniques for building such products, and still more specifically to drum-transfer techniques for assembling narrow components onto a building drum, particularly in the context of an automatic tire building system having a sequence of work stations,.

BACKGROUND ART

The manufacture of laminated rubber and synthetic rubber products like tires and drive belts is commonly accomplished using a drum-transfer building technique. This technique involves the use of a "building drum" on which components of the product are assembled, and a number of "measuring" or "measuring" drums from which components of the product are transferred to the building drum. Each component of the product is initially placed onto the surface of a measuring drum at a "work station" and is cut to the right length. The measuring drum is then moved towards the building drum until the component contacts the building drum. The rotation of the building drum with respect to the measuring drum causes the component to transfer from the measuring drum to the building drum. An example of a measuring drum is disclosed in U.S. Pat. No. 4,504,337. In an automatic tire building system, such as disclosed in U.S. Patent Application entitled METHOD FOR MANUFACTURING TIRES ON A FLEXIBLE MANUFACURING SYSTEM, Attorney's Docket No. DN2001166USA, the building drum travels from work station to work station, receiving one or more components at each work station until the product (or a subassembly thereof) is completed on the building drum. In this tire building system, a plurality of building drums are employed in "pipeline" fashion such that at any given time there are building drums in process at different work stations or in transit between stations, each drum serially acquiring product components.

This drum-transfer process is shown schematically in FIGS. 1A–1C. FIG. 1A shows a drum-transfer assembly portion 10 of a work station wherein a measuring drum 12 has had a tire component 14 placed on the surface thereof and the component 14 has been cut to length. A building drum 16 is in position, spaced away from the measuring drum 12, awaiting transfer of the product component 14. The measuring drum 12 and building drum 16 are placed in contact with each other, as shown in FIG. 1B. The measuring drum 12 and the building drum 16 are rotated in coordination with one another to cause the component 14 to release from the measuring drum 12 and adhere to the building drum 16. Once the transfer of the component 14 to the building drum 16 is complete, the measuring drum 12 and building drum 16 are spaced from each other in preparation for receiving a new component 14, as shown in FIG. 1C.

Typically, one or more tire components 14 are applied to the building drum 16 from the measuring drum(s) at each work station. When two of the same type but spaced tire components are assembled onto the tire building drum at the same work station, it has been difficult to apply them both at the same station, especially when the two spaced-apart narrow components 14 are close to each other. An example of applying two components is the assembly of two tire inserts of a runflat tire, wherein the two insert components are transferred to the building drum from two measuring drums at the same work station.

A two-component assembly technique of this type is illustrated schematically in FIG. 2. FIG. 2 shows a top view of a portion 10A of a two-component work station comprising a pair of narrow measuring drums 12A and 12B positioned side by side, each having been prepared with a respective tire component 14A and 14B, such as tire insert components, for transfer to a waiting building drum 16.

Two-component assembly at a single work station has at least two significant advantages over single component assembly: speed of assembly and conservation of manufacturing floor space. Multiple component assembly, however, is limited by the number of measuring drums that can be positioned side by side in a work station and by the position of the components within the product. If the components must be placed very close to one another on the building drum, it is not possible to position two measuring drums closely enough together in a side by side configurations to place both components in their correct positions.

It would be advantageous, however, if there were a way to assemble multiple, narrow, closely-spaced components of a tire construction onto a tire building drum at the same work station, since the size and cost of separate work stations and additional assembly time is disproportionate to the size, cost and value of some narrow components.

As an example, where several narrow components, such as a bead filler and a support strip are both located in the bead area of a vehicle tire are narrow, it is possible to assemble the two bead filler components at one work station and the two narrow support strips at another work station. Using prior-art techniques it is not possible, however, to assemble the both the support strips and the bead filler components at the same assembly station, since the bead filler component is assembled at least partially on top of the support strip component, preventing the use of side by side measuring drums.

In view of the aforementioned difficulty in assembling multiple, closely-spaced, narrow components at a single work station, and in light of the clear advantages of doing so, there is an ongoing need for improved drum-transfer assembly techniques.

SUMMARY OF THE INVENTION

According to the invention, multiple components are assembled onto a building drum at a work station by providing measuring drums that are independently controllable in two dimensions: laterally (parallel with respect to the building drum axis of rotation) and longitudinally (perpendicular to the building drum axis of rotation). A first set of measuring drums is positioned laterally to the inside of a second set of measuring drums such that they can be moved independent of one another without collision. Generally speaking, the first and second sets of drums travel alternately between first and second transfer positions, respectively, adjacent the building drum, first and second ready positions slightly spaced from the building drum and first and second component loading positions, respectively. When the first set of measuring drums is at the first component loading position receiving new tire components, the second set of measuring drums is positioned at the second ready or second transfer position near the building drum. The first set of measuring drums is retracted (longitudinally) from the first transfer and first ready positions to the first component loading position while the second set of measuring drums travels outside of the first set of measuring drums to a second ready position and finally to a second transfer position adjacent the building drum to apply components onto the building drum. When the first set of measuring drums moves from the first ready position to the first loading position, new components are applied thereto. After transferring components from the second set of measuring drums to the building drum, the second set of measuring drums are retracted from the second transfer position to the second ready position and finally to the second loading position while the first set of measuring drums is moved back to the first transfer position as described before. After the components are applied to the tire building drum, it moves on to a next work station, a new building drum is moved into position in the work station, and the cycle begins again.

When a set of measuring drums (first or second set) arrives at the first or second ready position adjacent the building drum, they are positioned laterally to clear the other set of measuring drums, and must be repositioned laterally to assemble their tire components onto the building drum in the correct position. After transferring the tire components to the building drum, the set of measuring drums move back to their respective first or second ready position and once again repositioned laterally to clear the other set of measuring drums in travel back to their respective loading positions.

According to a method aspect of the invention, multiple components are assembled onto one or more tire building drums by providing first and second sets of measuring drums, and providing first and second sets of components on the first and second sets of measuring drums, respectively. The first set of measuring drums is positioned into a first ready position adjacent the tire building drum and the second set of measuring drums is positioned in a second loading position. Then the first set of measuring drums is retracted away from the tire building drum to a first loading position and the second set of measuring drums is moved around the first set of measuring drums to a second ready position adjacent the tire building drum.

According to a further aspect of the invention, the first set of components is transferred from the first set of measuring drums to the tire building drum by moving the first set of measuring drums from the first ready position to a first transfer position.

According to a further aspect of the invention, the second set of components is transferred from the second set of measuring drums to the tire building drum by moving the second set of measuring drums from the second ready position to a second transfer position.

According to a further aspect of the invention, a new first set of components is applied to the first set of measuring drums while the first set of measuring drums is in the first loading position.

According to a further aspect of the invention, a new second set of components is applied to the second set of measuring drums while the second set of measuring drums is in the second loading position.

According to another aspect of the invention, the tire building drum is moved into a work station from a previous work station prior to assembling either first or second set components thereto.

According to another aspect of the invention, the tire building drum is moved from the work station to a next work station after assembling first and second set components thereto.

According to another method aspect of the invention, multiple component assembly onto a tire building drum having an axis of rotation located at a work station. The method involves the steps of:

providing a building drum having an axis of rotation at the work station;

providing a first set of inner measuring drums with axes of rotation parallel to the axis of rotation of the building drum, each inner measuring drum being independently movable parallel to and perpendicular to the axis of rotation of the building drum;

disposing a first set of components on the first set of inner measuring drums;

providing a second set of outer measuring drums with axes of rotation parallel to the axis of rotation of the building drum, each outer measuring drum being independently movable parallel to and perpendicular to the axis of rotation of the building drum;

disposing a second set of components on the second set of measuring drums controlling the first and second sets of measuring drums to move between respective first and second loading positions and respective first and second ready positions adjacent the tire building drum such that the first and second measuring drums clear one another as they travel;

transferring the first set of components from the first set of measuring drums to the building drum; and transferring the second set of components from the second set of measuring drums to the building drum.

According to an aspect of the invention, the first set of measuring drums are moved longitudinally towards the building drum from a first loading position inside of the second set of measuring drums, to a first ready position adjacent the building drum in preparation for transferring the first set of components onto the building drum.

According to another aspect of the invention, the second set of measuring drums are moved longitudinally towards the building drum from a second loading position outside of the first set of measuring drums, to a second ready position adjacent the building drum in preparation for transferring the second set of components onto the tire building drum.

According to another aspect of the invention, the step of providing a building drum at the building location comprises moving a building drum from a previous location to the work station.

According to another aspect of the invention, motion of the first and second sets of measuring drums is controlled so that they follow specific paths. Simultaneously, the second set of drums is moved laterally apart from one another at the second ready position and then longitudinally away from the tire building drum to a second loading position while the first set of drums is moved from the first loading position, longitudinally towards the tire building drum to a first ready position prior to transferring the first set of components to the tire building drum at the first transfer position. Then, simultaneously, the first set of measuring drums is moved back to the first ready position, laterally together, and then longitudinally away from the tire building drum to a first loading position while the second set of measuring drums is moved laterally outside of the first set of measuring drums and longitudinally towards the tire building drum to a second ready position adjacent the tire building drum prior to transferring the second set of components at the second transfer position to the tire building drum.

According to another aspect of the invention, new components are applied to the first and second sets of measuring drums while they are in their respective first and second loading positions.

The present invention also describes a work station for assembling multiple components onto a building drum at a work station, comprising a first set of measuring drums and a second set of measuring drums, a building location for receiving a building drum, the building drum having an axis of rotation, and independently controllable means for effecting lateral and longitudinal motion of each of the first and second sets of measuring drums.

Alone or in combination, the various aspects of the invention permit multiple, different types of components to be assembled on a tire building drum at a single work station, thereby saving production floor space, reducing assembly time, and lowering equipment and assembly costs.

The present invention is particularly useful in conjunction with a system for simultaneously building a plurality of tire carcasses, such as is disclosed in the aforementioned copending Patent Application entitled METHOD FOR MANUFACTURING TIRES ON A FLEXIBLE MANUFACURING SYSTEM, Attorney's Docket No. DN2001166USA and described hereinbelow with respect to FIGS. 1A, 1B, 1C, 1D and 2. The method disclosed therein generally comprises the tire building steps of establishing a sequence of at least three and up to ten work stations; advancing at least three disconnected tire building drums along a working axis extending through the at least three work stations; and applying one or more tire components to the tire building drums at each of the work stations. Then the resulting green tire carcass is removed at the last of the work stations. Finally, the tire building drum is advanced from the last work station after the green carcass has been removed to the first work station.

BRIEF DESCRIPTION OF THE DRAWINGS

These and further features of the present invention will be apparent with reference to the following description and drawing, wherein.

Figure 1A:
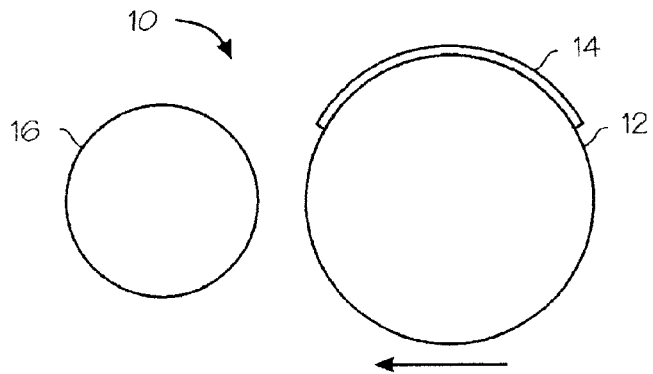
FIGS. 1A–1C is a schematic view of a portion of a prior-art drum-transfer work station.

In the detailed description that follows, identical components have been given the same reference numerals, regardless of whether they are shown in different embodiments of the present invention. To illustrate the present invention in a clear and concise manner, the drawings may not necessarily be to scale and certain features may be shown in somewhat schematic form.

DETAILED DESCRIPTION OF THE INVENTION

The present inventive technique eliminates the need to apply two types of narrow components onto a tire building drum at separate locations by permitting two-dimensional repositioning of measuring drums to permit assembly of additional tire components at the same tire building work station.

According to the invention, a technique for assembling multiple tire components onto a tire building drum comprises four, independently controllable measuring drums at a single tire building work station. Each of the measuring drums is mounted to a carriage that can move its respective drum in two dimensions. Each measuring drum can be moved towards the building drum or away from it. Each measuring drum can also be moved laterally, parallel to the axis of rotation of the building drum.

In operation, two of the measuring drums are positioned to transfer two tire components onto the building drum. Then, those two measuring drums are moved out of the way, and the two remaining measuring drums are moved into position to transfer two more tire components onto the tire building drum. While one set of measuring drums is transferring its tire components to the tire building drum, the other set is located in a loading position where it can receive new tire components and have them cut to length.

The travel of the four measuring drums relative to the building drum is shown and described hereinbelow with respect to FIGS. 3A–3F. For simplicity and illustrative clarity, drive components such as motors, gears and belts are omitted. For the same reasons, loading and trimming of the components, which are well known to those of ordinary skill in the art, are also omitted.

Figure 1B:
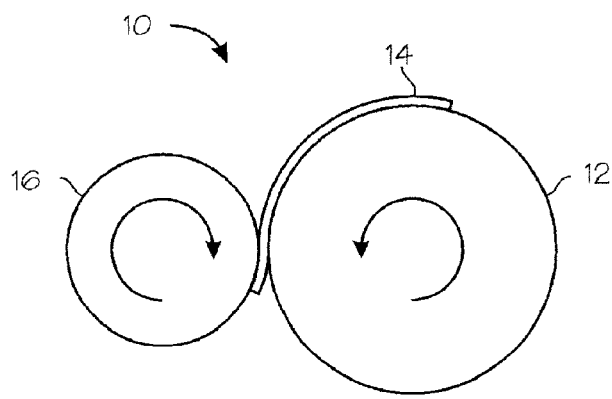
Figure 1C:
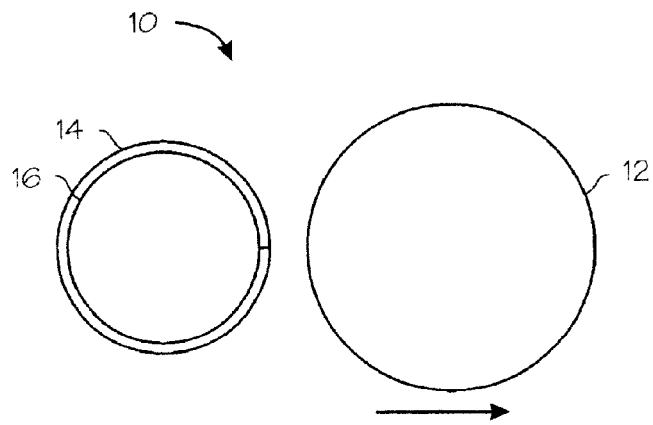
Figure 2:
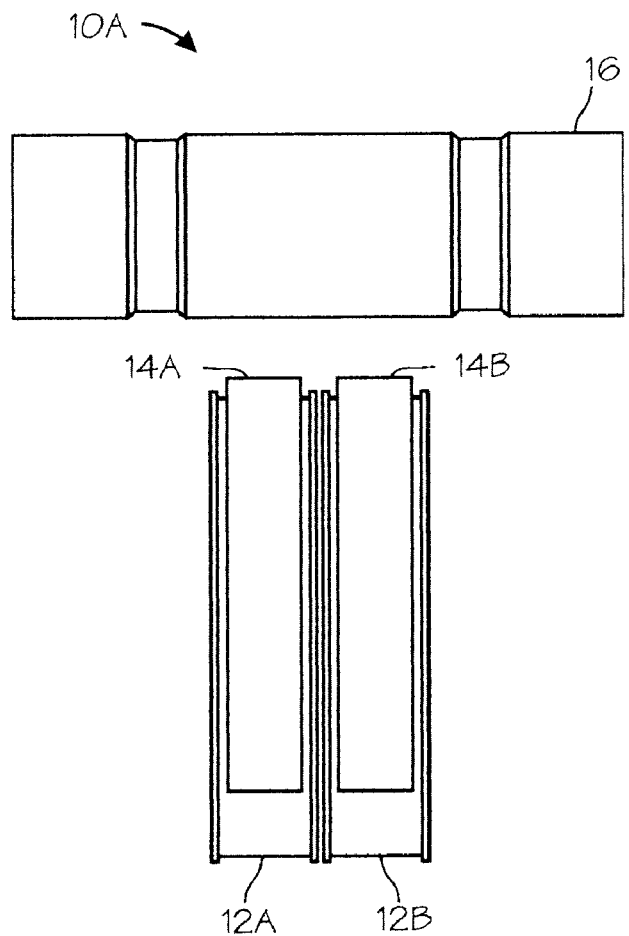
FIG. 2 is a top view of a portion of a prior-art drum-transfer work station with two measuring drums.
Figure 3A:
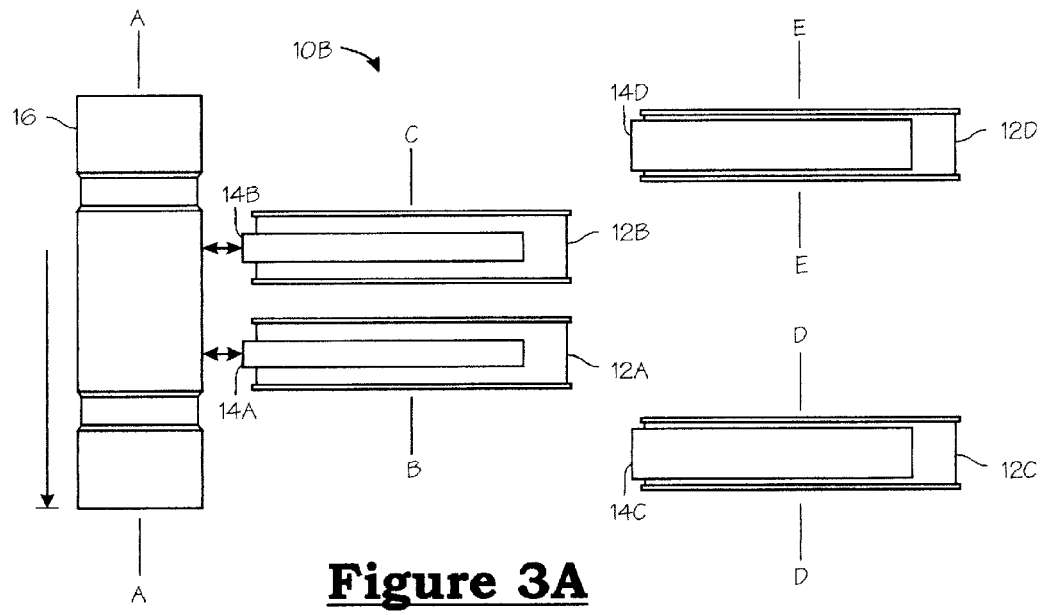
FIGS. 3A–3F are top views of an arrangement of four measuring drums for transferring multiple narrow components onto a building drum, according to the invention.

FIG. 3A is a top view of a portion 10B of a tire building work station having four measuring drums 12A, 12B, 12C, and 12D. Each measuring drum 12A, 12B, 12C, and 12D is loaded with a respective tire material component 14A, 14B, 14C and 14D disposed on a surface thereof and cut to length to be transferred (assembled) onto a tire building drum 16. The tire building drum 16 moves into the position shown at the tire building work station from a previous location. There, the tire building drum 16 rotates on an axis of rotation "A". Each of the measuring drums 12A, 12B, 12C and 12D rotates on a respective axis of rotation, labeled "B", "C", "D", and "E", respectively, in FIG. 3A. In FIG. 3A, two "inner" measuring drums 12A and 12B are shown in a first "ready" position adjacent to the tire building drum 16. They are shown already positioned laterally outward from their initial position at the ready position with respect to the tire building drum 16 to transfer their respective components 14A and 14B onto the tire building drum 16 at the correct position, in the manner shown and described hereinabove with respect to FIGS. 1A–1C. As indicated by arrows in FIG. 3A, the two inner measuring drums 12A and 12B are then moved from their "first ready" position towards the tire building drum 16 into a first transfer position where the tire material components 14A and 14B are transferred onto the tire building drum 16. Once the tire material components 14A and 14B have been transferred, the two inner measuring drums 12A and 12B retract back to their first ready position. During this time, two "outer" measuring drums 12C and 12D are spaced apart from one another laterally (with respect to the axis "A" of the tire building drum 16) and are in a second "retracted" or "loading" position away from the building drum 16.

Figure 3B:
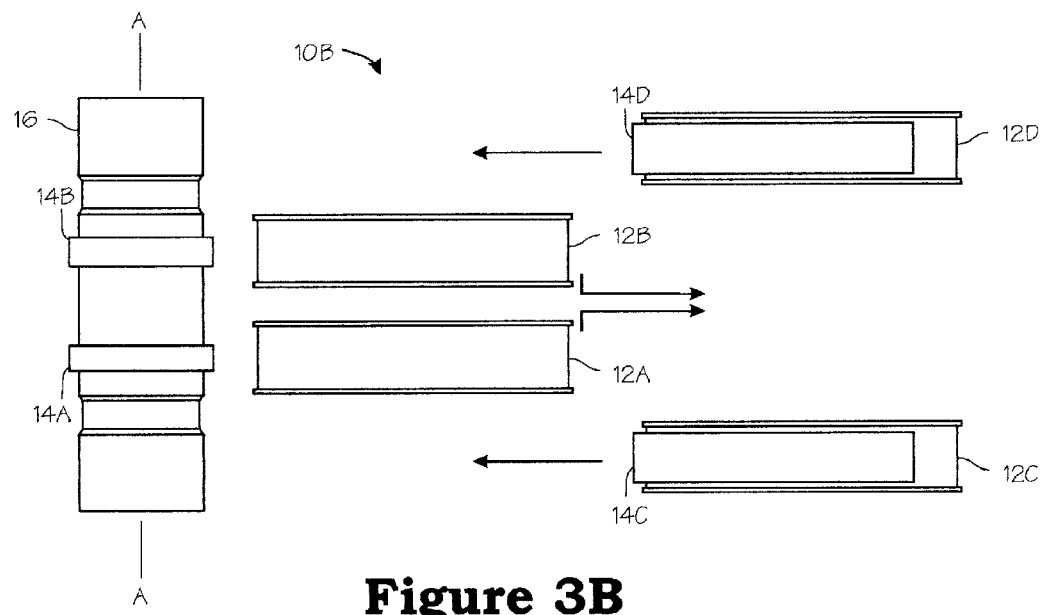

Next, the two "inner" measuring drums 12A and 12B are moved close together in their "first ready" position, as needed to clear the "outer" measuring drums 12C and 12D, and retracted back away from the tire building drum 16 into the first loading position where they will receive new, replacement components 14A and 14B, respectively. Either in sequence or simultaneously, the two "outer" measuring drums 12C and 12D are moved towards the tire building drum 16 as generally indicated by arrows in FIG. 3B to the second ready position. The relative lateral positions of the "inner" measuring drums 12A and 12B and "outer" measuring drums 12C and 12D during this motion are chosen so that the drums clear one another during their travel. FIG. 3B shows the material components 14A and 14B from the "inner" measuring drums 12A and 12B assembled onto the tire building drum 16.

Figure 3C:
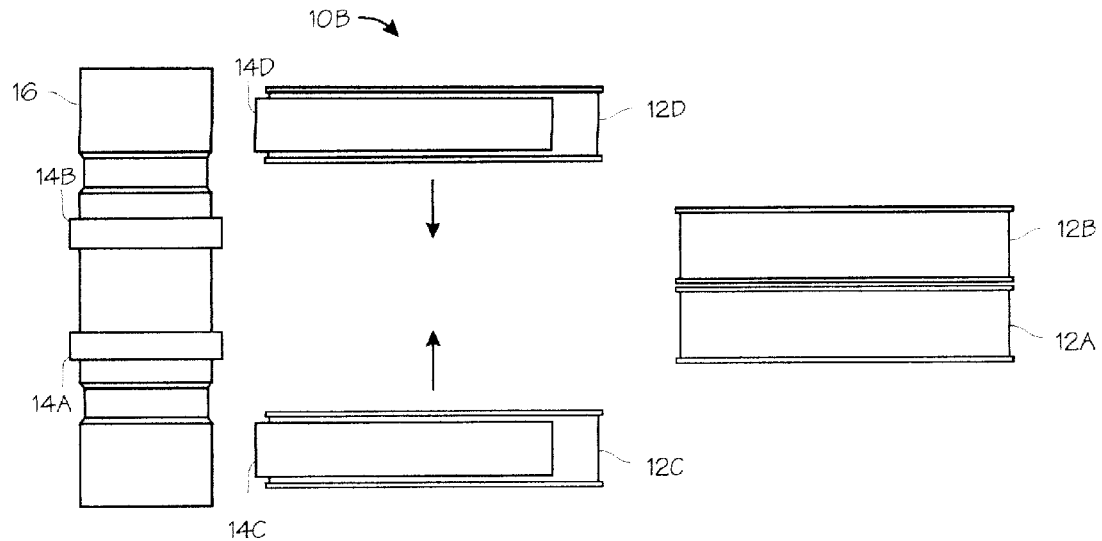

Next, as shown in FIG. 3C, the two "inner" measuring drums 12A and 12B are retracted to their first loading position and the two "outer" measuring drums 12C and 12D move forward towards the second ready position, spaced from the drum 16. Next, the "outer" measuring drums 12C and 12D move laterally with respect to the tire building drum 16 towards one another until they reach the correct second ready position for transferring their respective components 14C and 14D onto the tire building drum 16. This motion is generally indicated by arrows in FIG. 3C.

Figure 3D:
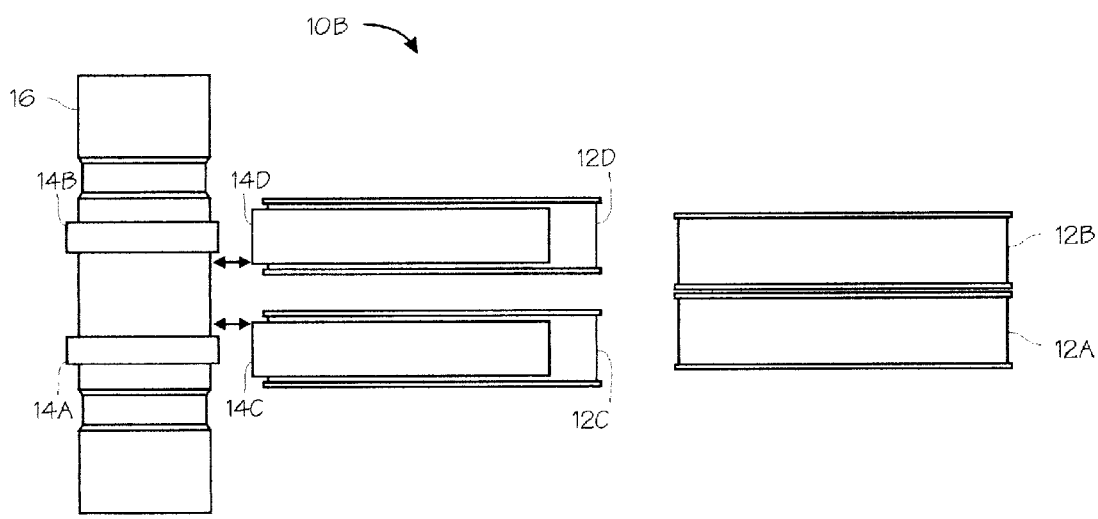
Figure 3E:
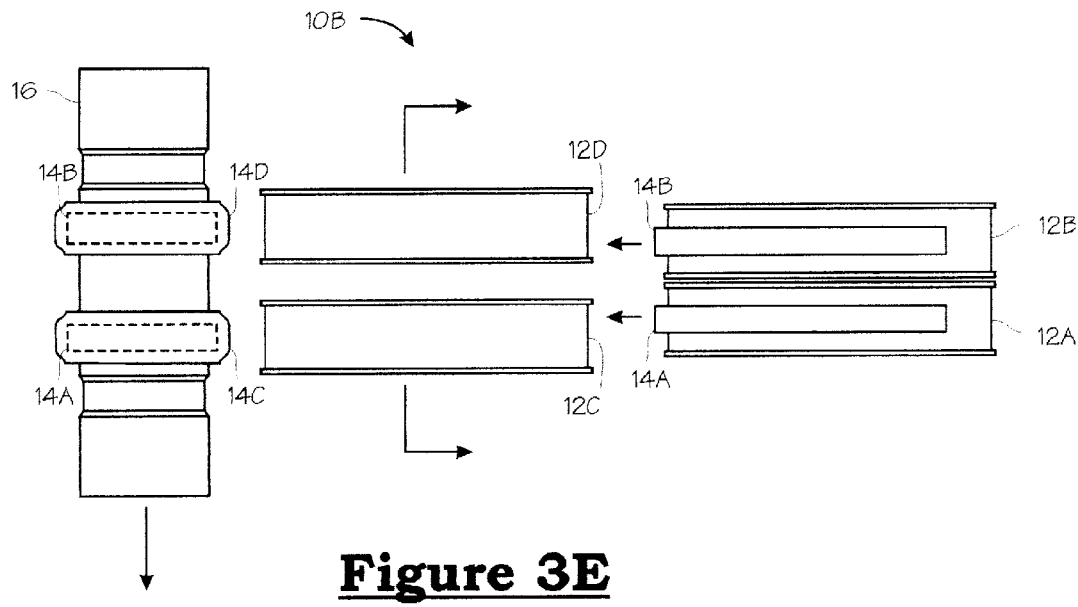
Figure 3F:
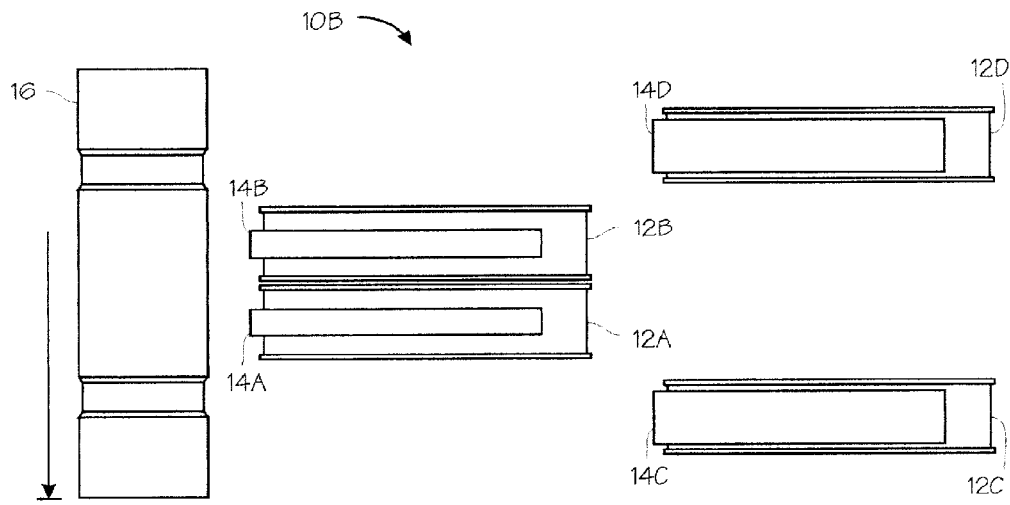

The two "outer" measuring drums 12C and 12D are shown in their second ready position in FIG. 3D. As generally indicated by arrows, the two "outer" drums are then moved towards the tire building drum 16 to the second transfer position to transfer their tire material components 14C and 14D and then moved back to the second ready position in the same manner as described hereinabove with respect to FIG. 3A for the two "inner" measuring drums 12A and 12B. The tire components 14C and 14D can be positioned to overlap or completely cover the previously placed tire components 14A and 14B. FIG. 3E shows the "outer" measuring drums 12C and 12D in position adjacent the tire building drum 16 after having transferred their respective material components 14C and 14D thereto.

Next, the tire building drum 16 is moved onwards towards another work station, as generally indicated by an arrow in FIG. 3E. Essentially reversing their previous motion described hereinabove with respect to FIGS. 3B and 3C the measuring drums 12C and 12D move laterally apart from one another and back into their "retracted" or "loading" position and the inner measuring drums 12A and 12B move forward towards the tire building drum 16 into their "ready" position. (as generally indicated by arrows in FIG. 3E). The four measuring drums 12A, 12B, 12C, and 12D are shown in these positions in FIG. 3F. As generally indicated by an arrow in 3F, another tire building drum 16 is moved into position and the cycle starts again. The outer measuring drums 12C and 12D receive new, replacement tire material components 14C and 14D, the inner measuring drums 12A and 12B will transfer their tire components 14A and 14B to the building drum, etc., as before. The two outer measuring drums 12C and 12D, and the two "inner" measuring drums 12A and 12B continue their cycle of moving towards and away from the building drum 16 to apply their respective components.

Figure 4:
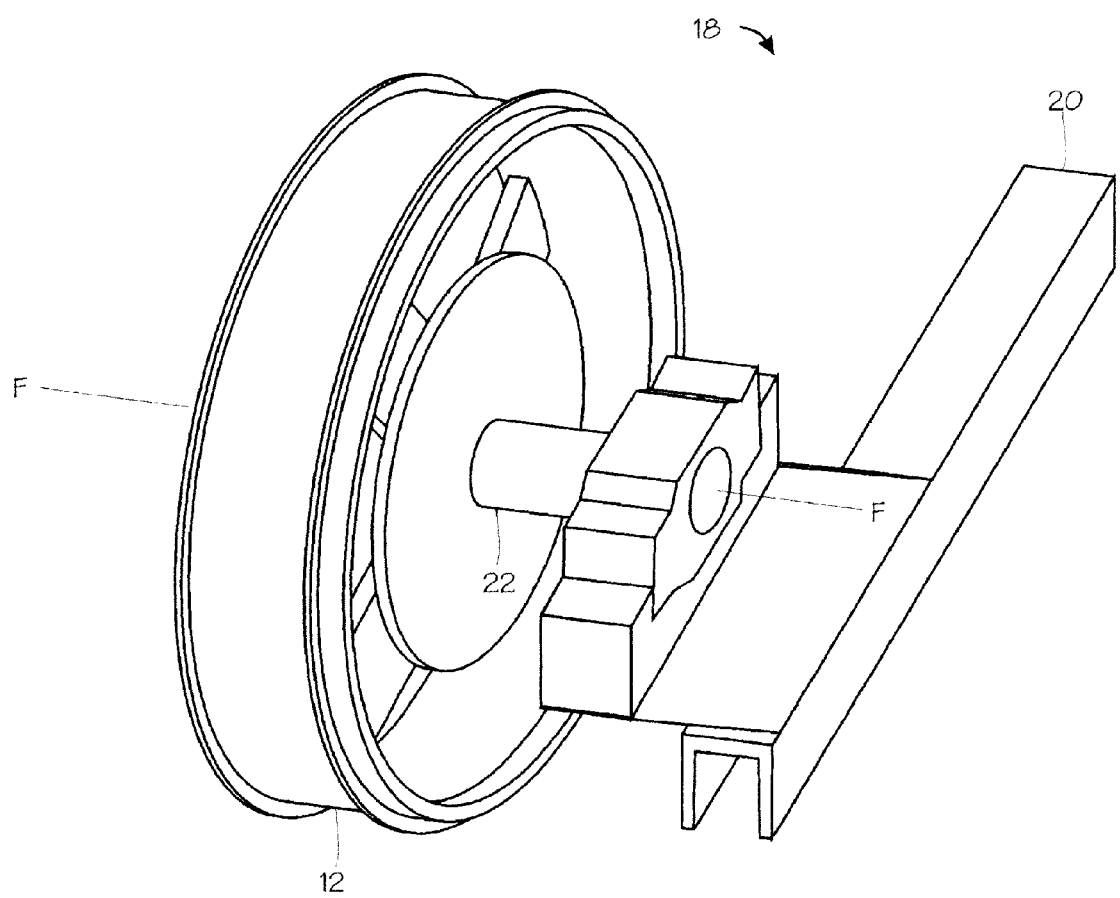
FIG. 4 is a view of a measuring drum assembly, according to the invention.

FIG. 4 is a view of a measuring drum assembly 18 comprising a measuring drum 12 mounted to a support arm and support base assembly 20. The measuring drum 12 rotates on an axle 22 attached to the support base assembly 20. Each support base assembly 20 attaches to a respective "follower" (described hereinbelow with respect to FIG. 5A). For illustrative simplicity and clarity, means for rotating, braking and monitoring the position of the measuring drum 12 are not shown. Such means are well known to those of ordinary skill in the art and will not be further elaborated upon herein.

Figure 5A:
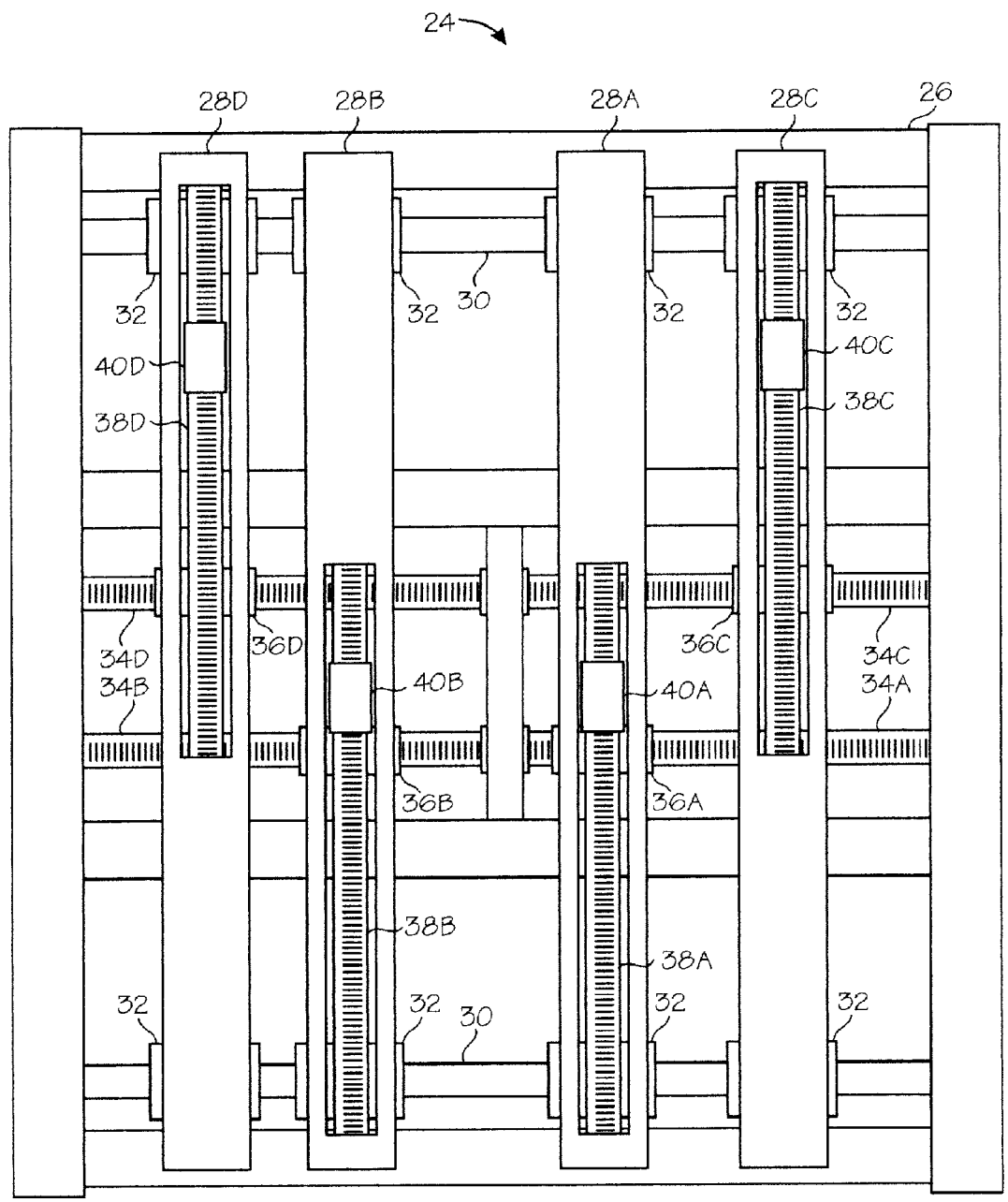
FIG. 5A is a top view of a support frame and carriage assembly for effecting the motion of four measuring drums at a single work station, according to the invention.

FIG. 5A is a top view of a station frame assembly 24 for effecting the independent motion of four measuring drums, but with the measuring drums and support base assemblies removed to show underlying components. The station frame assembly 24 comprises a support frame 26. Four measuring drum carriages 28A, 28B, 28C and 28D travel along a "lateral" path defined by guide rods 30 and by means of guide rod bushings 32. Two "inner" measuring drum carriages 28A and 28B are mounted adjacent to one another along the path defined by the guide rods 30, with two "outer" measuring drum carriages 28C and 28D mounted to the outside of the two "inner" measuring drum carriages 28A and 28B. Four independently controlled lateral leadscrews 34A, 34B, 34C and 34D, mounted parallel to the guide rods 30, control the lateral positions of four lateral leadscrew followers 36A, 36B, 36C and 36D, respectively, attached to the measuring drum carriages 28A, 28B, 28C and 28D, respectively, thereby permitting independent control of the lateral positions thereof. Four longitudinal leadscrews 38A, 38B, 38C and 38D are mounted in the four measuring drum carriages 28A, 28B, 28C and 28D, and are oriented perpendicular to the lateral leadscrews 34A, 34B, 34C and 34D along the length of the carriages 28A, 28B, 28C and 28D, respectively. Each longitudinal leadscrew 38A, 38B, 38C, and 38D controls the longitudinal position of a respective longitudinal leadscrew follower 40A, 40B, 40C, and 40D. For illustrative clarity, leadscrew drive motors, belts, gears, position monitors, etc., have been omitted. The purpose and function of such items is well known to those of ordinary skill in the art and will not be further elaborated upon herein.

Figure 5B:
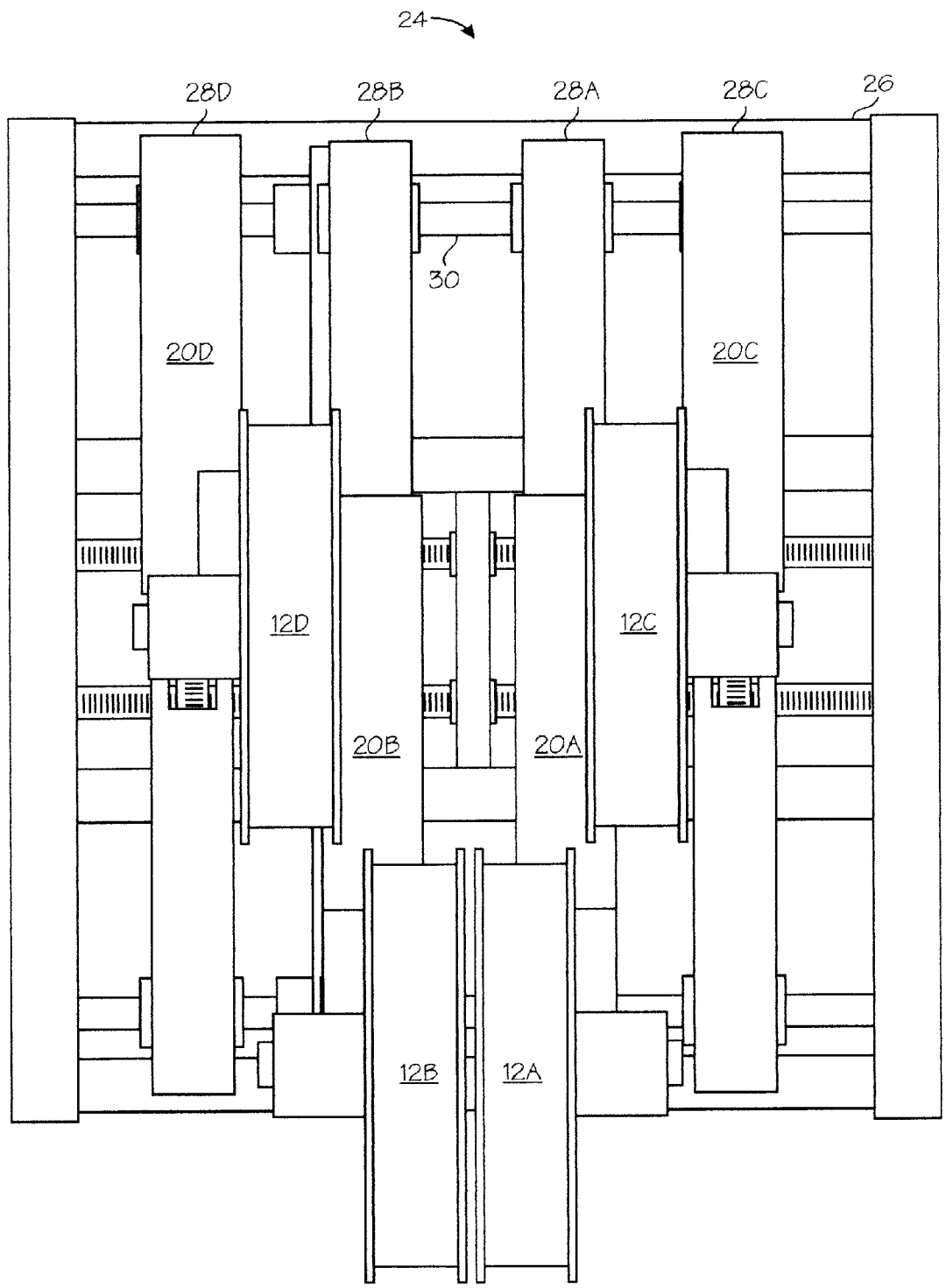
FIG. 5B is the support frame and carriage assembly of FIG. 5A with measuring drum assemblies assembled thereto, according to the invention.

FIG. 5B is a top view of the station frame assembly 24 with measuring drums 12A, 12B, 12C and 12D mounted to measuring drum carriages 28A, 28B, 28C, and 28D, respectively, by means of support base assemblies 20A, 20B, 20C, and 20D, respectively. Each support base assembly 20A, 20B, 20C, and 20D attaches to a respective longitudinal leadscrew follower 40A, 40B, 40C and 40D, to control the longitudinal position of its respective measuring drum 12A, 12B, 12C and 12D. The lateral position of the measuring drums 12A, 12B, 12C and 12D is controlled by lateral leadscrews 34A, 34B, 34C and 34D, respectively (see FIG. 5A).

Although the invention has been shown and described with respect to a certain preferred embodiment or embodiments, it is evident that equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A method of assembling multiple tire components onto one or more tire building drums at a work station of a tire building system, comprising the steps of:

providing an first set of measuring drums at a first loading position and an second set of measuring drums at a second loading position where the second set of measuring drums is disposed laterally spaced apart from one another and on either side of the first set of measuring drums;

loading a first set of tire components on the first set of measuring drums at the first loading position and loading a second set of tire components on the second set of measuring drums at the second loading position;

moving the first set of measuring drums from the first loading position to a first ready position adjacent the one or more tire building drums;

moving the first set of measuring drums back from the first ready position to the first loading position; and moving the second set of measuring drums towards the one or more tire building drums in manner so as to pass outside of and around the first set of measuring drums;

positioning the second set of measuring drums laterally toward each other in a second ready position; and moving the second set of measuring drums back from the second ready position to the second loading position in a manner so as to pass outside of and around the first set of measuring drums.

2. A method according to claim 1, further comprising the step of:

moving the first set of measuring drums from the first ready position towards the one or more tire building drum to a first transfer position where the first set of components are applied onto the one or more tire building drums.

3. A method according to claim 1, further comprising the step of:

moving the second set of measuring drums from the second ready position towards the one or more tire building drum to a second transfer position where the second set of components are applied onto the one or more tire building drums.

4. A method according to claim 1, further comprising the step of:

applying a new first set of components to the first set of measuring drums when the first set of measuring drums moves back to the first loading position from the first ready position.

5. A method according to claim 4, further comprising the step of:

applying a new second set of components to the second set of measuring drums when the second set of measuring drums moves back to the second loading position from the second ready position.

6. A method according to claim 1, further comprising the steps of:

moving one of the one or more tire building drums out of the work station; and positioning another of the one or more tire building drums into the work station prior to transferring either first or second set components thereto.

7. A method according to claim 6, further comprising the steps of:

moving the one or more tire building drums to a next work station after assembling both first and second set components thereto.

8. A method of assembling multiple components onto one or more tire building drums, comprising the steps of:

providing a work station for receiving one or more tire building drums, each of the one or more tire building drums having an axis of rotation;

locating one of the one or more tire building drums in the work station;

providing a first set of measuring drums with axes of rotation parallel to the axis of rotation of the one or more tire building drums located in the work station, each of the first set of measuring drums being independently movable both parallel to and perpendicular to the axis of rotation of the tire building drum located in the work station;

disposing a first set of components on the first set of measuring drums at a first loading position;

providing a second set of measuring drums with axes of rotation parallel to the axis of rotation of the tire building drum located in the work station, each second set of measuring drums being independently movable both parallel to and perpendicular to the axis of rotation of the tire building drum located in the work station;

disposing a second set of components on the second set of measuring drums at a second loading position; and controlling the first and second sets of measuring drums to move between first and second loading positions, respectively, and first and second ready positions, respectively, such that the first and second sets of measuring drums clear one another as they move between their respective first and second loading positions and their first and second ready positions;

moving the first set of measuring drums from the first ready position to a first transfer position to transfer the first set of components from the first set of measuring drums to the tire building drum located in the work station; and moving the second set of measuring drums from the second ready position to a second transfer position to transfer the second set of components from the second set of measuring drums to the tire building drum located in the work station.

9. A method according to claim 8, further comprising the steps of:

moving the first set of measuring drums towards the tire building drum in the work station from a position in the first loading position inside of the second set of measuring drums; and positioning said first set of measuring drums at the first ready position adjacent the tire building drum prior to transferring the first set of components thereto.

10. A method according to claim 9, further comprising the steps of:

moving the second set of measuring drums longitudinally towards the tire building drum in the work station from a position laterally outside of the first set of measuring drums; and positioning the second set of building drums laterally to the second ready position adjacent the tire building drum prior to transferring the second set of components thereto.

11. A method according to claim 8, wherein the step of locating one of the one or more tire building drums in the work station comprises the step of:

moving the one tire building drum from a previous work station to the work station.

12. A method according to claim 8, further comprising the steps of:

moving the second set of measuring drums back from the second transfer position to the second ready position;

simultaneously moving the second set of measuring drums laterally apart from one another at the second ready position and then back to the second loading position while moving the first set of measuring drums from the first loading position while positioned laterally inside of the second set of measuring drums to the first ready position; and moving the first set of measuring drums back from the first transfer position to the first ready position;

simultaneously moving the first set of measuring drums laterally together and back to the first loading position while moving the second set of measuring drums from the second loading position while positioned laterally outside of the first set of measuring drums to the second ready position.

13. A method according to claim 12, wherein the steps of:

the step of locating the building drum at the work station comprises moving a building drum from a previous work station to the work station prior to transferring the first and second set components thereto.

* * * * *